March 11, 1924.
D. HILL
LOCK FOR ODOMETERS
Filed Oct. 3, 1922
1,486,749
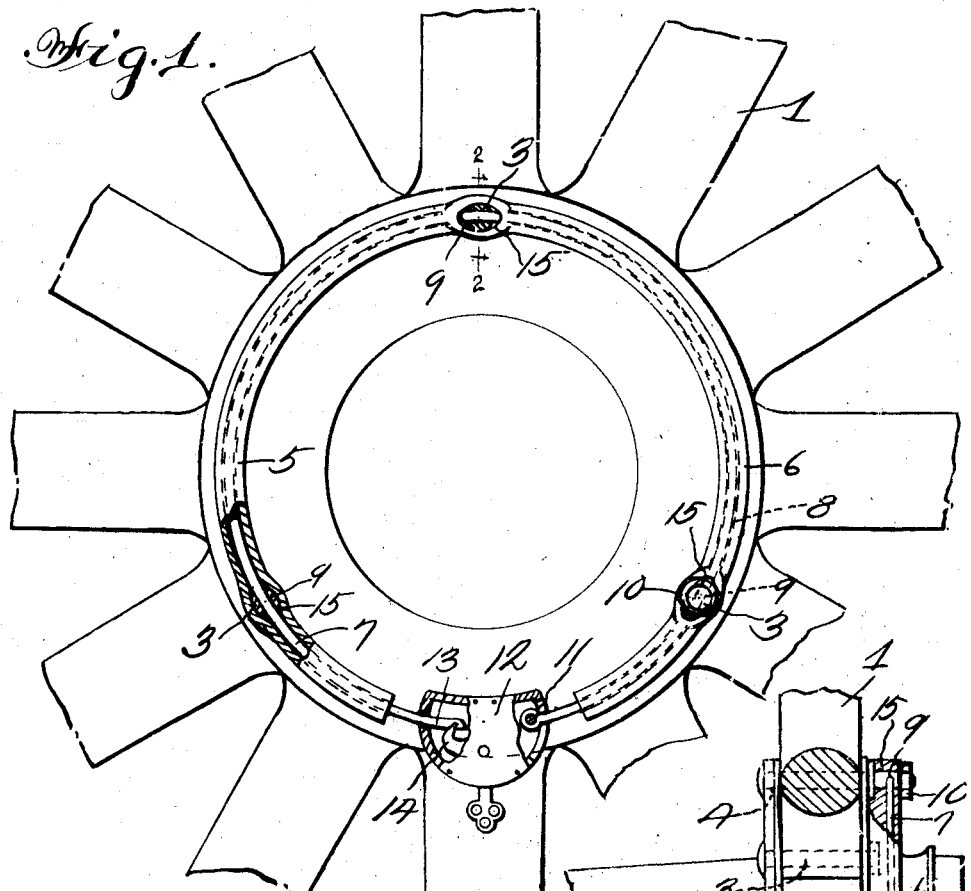
Fig. 1.
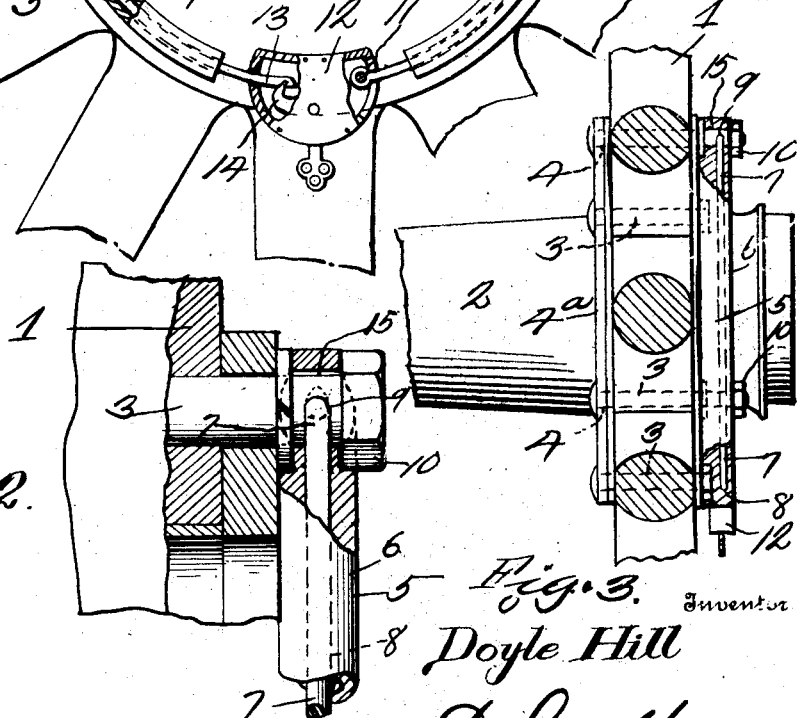
Fig. 2.
Fig. 3.
Inventor
Doyle Hill
By D. Swift
Attorney Patented Mar. 11, 1924.

1,486,749

UNITED STATES PATENT OFFICE.

DOYLE HILL, OF OMAHA, NEBRASKA.

LOCK FOR ODOMETERS.

Application filed October 3, 1922. Serial No. 592,128.

*To all whom it may concern:*

Be it known that I, DOYLE HILL, a citizen of the United States, residing at Omaha, in the county of Douglas, State of Nebraska, have invented a new and useful Lock for Odometers; and I do hereby declare the following to be a full, clear, and exact description of the invention, such as will enable others skilled in the art to which it appertains to make and use the same.

The invention relates to locks for locking odometers of the hub type on vehicle wheels in such a manner that they cannot be removed from the wheel for preventing registering of the odometer.

A further object is to provide in combinations with bolts for securing an odometer to a vehicle wheel hub, an annular hollow metallic member having transverse apertures for the reception of the ends of the bolts and a flexible metallic member adapted to be forced through the hollow member and through apertures in the ends of the bolts. Also to provide one end of the flexible member with a lock which receives the other end of the flexible member thereby locking the device securely on the bolts and preventing removal of the odometer or tampering therewith.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is an inside elevation of a portion of a conventional form of wheel showing the odometer locking device applied thereto, said locking device being partially in section to better illustrate the same.

Figure 2 is an enlarged detail sectional view taken on line 2—2 of Figure 1.

Figure 3 is a side elevation of a hub odometer, a portion of the wheel and the locking device, parts broken away to better show the device.

Referring to the drawing, the numeral 1 designates a portion of a conventional form of automobile wheel, to which wheel is secured a conventional form of hub odometer 2 by means of bolts 3, which extend through apertures 4 in the odometer flange $4^a$. The present practice is to secure the odometer 2 in position by nuts on the bolts 3. However it is obvious that by unscrewing the nuts from the bolt that the odometer 2 may be disconnected from the wheel and consequently the odometer mechanism may be rendered inoperative, thereby allowing chauffeurs to operate taxicabs and the like without registering on the odometer and also allowing theft of the fare. To obviate this difficulty the locking device 5 is provided.

The locking device 5 comprises an annular hollow member 6 formed from metal, and preferably a hard metal and an annular flexible member 7, which flexible member extends through the passage 8 in the hollow member 6 and passes through apertures 9 in the bolts 3, thereby preventing outward movement of the odometer 2 when the nuts 10 are removed from the bolts 3. One end of the flexible member 7 is pivotally connected at 11 to a conventional form of lock 12, and the end 13 of the flexible member 7 extends into the lock 12 and is held therein by the keeper 14, in such a manner that the flexible member 7 cannot be removed from the lock until the lock is unlocked. The bolts 3 extend through transversely disposed openings 15 in the hollow member 6, the hollow member being preferably formed from a pipe flattened at spaced points.

From the above it will be seen that a locking device is provided for hub odometers, which device will prevent unauthorized persons from removing the odometer from the vehicle wheel. It will also be seen that when it is desired to remove the locking device the lock 12 may be unlocked and the device slightly spread adjacent the lock until the lock body is moved downwardly, after which a pull on the lock will pull the flexible member out of the hollow member 6 and out of the apertures 9 in the bolts 3.

The invention having been set forth what is claimed as new and useful is:—

1. The combination with a hub odometer, an annular flange carried by said odometer, said flange engaging the outer side of a wheel, securing bolts extending through the wheel and the odometer flange and concentrically disposed, of means connecting the inner ends of the bolts and disposed in engagement with the innner side of the wheel for locking said bolts against removal.

2. The combination with the inner ends of concentrically arranged bolts, said bolts extending through an odometer flange engaging the outer side of the wheel and through the wheel, of means for locking said bolts against removal, said means comprising a substantially angularly tubular member, spaced transverse apertures through the tubular member for the reception of the inner ends of the bolts and a flexible member extending through the tubular member and through apertures in the bolts.

In testimony whereof I have signed my name to this specification in the presence of two subscribing witnesses.

DOYLE HILL.

Witnesses:
H. E. WILLIAMS,
PERRY WHEELER.